US007855654B2

(12) United States Patent
Katz (10) Patent No.: US 7,855,654 B2
(45) Date of Patent: Dec. 21, 2010

(54) LOCATION RECORDING SYSTEM

(75) Inventor: Daniel A. Katz, 87 Tzahal St., Kiryat-Ono (IL) 55451

(73) Assignee: Daniel A. Katz, Kiryat-Ono (IL)

( * ) Notice: Subject to any disclaimer, the term of this patent is extended or adjusted under 35 U.S.C. 154(b) by 653 days.

(21) Appl. No.: 11/625,826

(22) Filed: Jan. 23, 2007

(65) Prior Publication Data
US 2008/0174484 A1    Jul. 24, 2008

(51) Int. Cl.
*G08B 23/00* (2006.01)
(52) U.S. Cl. ............... 340/573.6; 701/207; 340/539.13; 340/686.6; 340/539.21; 340/539.23
(58) Field of Classification Search .............. 340/442, 340/573.6, 539.12, 539.13, 539.21, 539.23, 340/686.6; 342/357.01–357.13, 353; 701/207
See application file for complete search history.

(56) References Cited

U.S. PATENT DOCUMENTS

| | | | | |
|---|---|---|---|---|
| 4,747,120 | A | * | 5/1988 | Foley .......................... 379/38 |
| 4,932,910 | A | * | 6/1990 | Hayday ....................... 441/11 |
| 5,032,823 | A | * | 7/1991 | Bower et al. .............. 340/572.8 |
| 5,103,474 | A | * | 4/1992 | Stoodley et al. ............. 455/403 |
| 5,367,306 | A | * | 11/1994 | Hollon et al. ............... 342/386 |
| 5,554,993 | A | * | 9/1996 | Brickell .................. 342/357.31 |
| 5,870,029 | A | * | 2/1999 | Otto et al. .............. 340/825.36 |
| 5,886,635 | A | * | 3/1999 | Landa et al. ............. 340/573.6 |
| 5,905,461 | A | * | 5/1999 | Neher .................... 342/357.07 |
| 5,963,130 | A | * | 10/1999 | Schlager et al. ............. 340/540 |
| 6,439,941 | B2 | * | 8/2002 | McClure et al. ............... 441/89 |
| 6,492,906 | B1 | * | 12/2002 | Richards et al. .......... 340/573.4 |
| 6,545,606 | B2 | * | 4/2003 | Piri et al. ................. 340/573.1 |
| 7,053,822 | B2 | * | 5/2006 | Rickerson, Jr. ......... 342/357.07 |
| 7,125,298 | B1 | * | 10/2006 | Frank .......................... 441/11 |
| 7,301,453 | B2 | * | 11/2007 | Fry ....................... 340/539.13 |
| 7,627,451 | B2 | * | 12/2009 | Vock et al. ................... 702/178 |
| 2002/0175853 | A1 | * | 11/2002 | Peeters et al. ............... 342/353 |
| 2003/0034881 | A1 | * | 2/2003 | Linnett et al. .......... 340/309.15 |
| 2004/0087284 | A1 | * | 5/2004 | Street .......................... 455/125 |
| 2007/0146207 | A1 | * | 6/2007 | Mohamadi ........... 343/700 MS |

\* cited by examiner

*Primary Examiner*—Benjamin C Lee
*Assistant Examiner*—Sigmund Tang (57) ABSTRACT

The present invention discloses a communication system and method for determining and recording the geographical location of an object attached with a short range wireless device, over a wide area, in a vicinity of a radio beacon that can be located by a remote control station, upon establishing or interrupting a wireless connection between said wireless device and said radio beacon. One embodiment of the invention relates to a system for search and rescue of a man overboard (person overboard), a quite frequent and fatal accident at sea.

26 Claims, 3 Drawing Sheets illustration of a system for determining and recording the geographical location of an object (person) attached with a short range wireless device (SRWD), over a wide area, in a vicinity of a radio beacon (RB), by a remote control station (RCS).

FIG. 1 – illustration of a system for determining and recording the geographical location of an object (person) attached with a short range wireless device (SRWD), over a wide area, in a vicinity of a radio beacon (RB), by a remote control station (RCS).

FIG. 2 Block diagram of SRWD according to a preferred embodiment of the invention (note: the microcontroller includes a Flash memory and a timer)

FIG. 3 Block diagram of RB according to a preferred embodiment of the invention (note: the microcontroller includes a Flash memory and a timer)

LOCATION RECORDING SYSTEM

BACKGROUND OF INVENTION

Too many persons are lost at sea due to accidents and lack of efficiently informing rescue teams of their fatal situation.

These situations become particularly difficult to deal with as they occur far away offshore, in hostile environmental conditions, with limited local resources for treatment.

The detection and location of an aircraft crash or maritime distress is of paramount importance to the search and rescue (SAR) teams and to the potential survivors. Studies show that while the initial survivors of an aircraft crash have less than a 10% chance of survival if rescue is delayed beyond two days, the survival rate is over 60% if the rescue can be accomplished within eight hours. Similar urgency applies in maritime distress situations, particularly where injuries have occurred. Furthermore, accurate location of the distress can significantly reduce both SAR costs and the exposure of rescue forces to hazardous conditions, and clearly improve efficiency. In view of this, Canada, France, Russia and the USA established the Cospas-Sarsat satellite system to reduce the time required to detect and locate SAR events world-wide.

Operational use of Cospas-Sarsat by SAR agencies started with the crash of a light aircraft in Canada, in which three people were rescued (Sep. 10, 1982). Since then, the System has been used for thousands of SAR events and has been instrumental in the rescue of over 17,000 lives worldwide.

Cospas-Sarsat is a satellite system designed to provide distress alert and location data to assist search and rescue (SAR) operations, using spacecraft and ground facilities to detect and locate the signals of distress beacons operating on 406 MHz or 121.5 MHz. The position of the distress and other related information is forwarded by the responsible Cospas-Sarsat Mission Control Centre (MCC) to the appropriate national SAR authorities. Its objective is to support all organizations in the world with responsibility for Search and Rescue (SAR) operations, whether at sea, in the air, or on land.

The Cospas-Sarsat System provides alerting services for the following types of beacons:

Emergency Locator Transmitters (ELTs) for aviation use

Emergency Position-Indicating Radio Beacons (EPIRBs) for maritime use

Personal Locator Beacons (PLBs) for applications which are neither aviation or maritime The use of satellites to detect and locate special-purpose radiobeacons, either manually activated or automatically activated by an aircraft crash or maritime distress situation, reduces the time required to alert the appropriate authorities and for final location of the distress site by the rescue team. The International Maritime Organization (IMO) and the International Civil Aviation Organization (ICAO) recommend that ships and aircraft carry Emergency Position Indicating Radio Beacon (EPIRBs) and Emergency Locator Transmitters (ELTs) respectively. In November 1988, the Conference of Contracting Governments to the International Convention for the Safety of Life at Sea, 1974 (SOLAS Convention) on the Global Maritime Distress and Safety System (1988 GMDSS Conference) adopted several amendments to the 1974 SOLAS Convention whereby, inter-alia, carriage of satellite EPIRBs on all convention ships of 300 tons and over became mandatory from 1 Aug. 1993.

Various national requirements also exist for the carriage of ELTs/EPIRBs on different types of craft not otherwise subject to international conventions, and some countries have authorized the use of Personal Locator Beacons (PLBs), 406 MHz emergency beacons for use on land, in remote or rugged areas.

Further information on COSPAS-SARSAT can be found at http://www.cospas-sarsat.org Modem navigation and communication systems, especially those based on satellites, such as COSPAS-SARSAT and GPS and Inmarsat and Iridium, provide reasonable solutions for vessels and aircraft in distress, however less efficient regarding to individuals that board such crafts and get into a distress situation, particularly persons over board (man over board=MOB), i.e. persons that fall to the sea from a vessel.

Although COSPAS-SARSAT supports a Portable Locator Beacon (PLB), which is provided, in different versions, by several manufacturers, this item is typically too bulky to be worn or carried continuously by crewmembers and passengers onboard craft, thus cannot provide an efficient solution for man-over-board situations, that may happen on the spot. Naturally, PLBs, as well as ELTs, EPIRBs and any other long range beacons, obtain a significant size and weight due to the need to communicate with far away satellites, hundreds and thousands kilometers away. Such a communications distance requires high power transmitters with accordingly high power sources. A high power transmitter requires relatively large components in order to dissipate heat and high capacity batteries which are large and heavy.

It is an object of the present invention to provide a system and method for the location of a person overboard, worldwide, being a passenger or a crewmember or even a single handed (i.e. sail alone) sailor, where this man-over-board wears a small and lightweight device such as a wristwatch, comfortable to be worn onboard and operate automatically in a man-over-board situation.

This invention, however, is not restricted to COSPAS-SARSAT. The prior art of location systems based on electronic methods typically applies wireless transmitters to objects that wished to be located, and a network of receivers that detect these transmissions and consequently calculate the object's position. For that purpose, "objects" might be persons, animals, pets, vehicles, containers, goods, valuables, mailed/delivered items, weapons, ammunition, hazardous materials and so on. Normally, these location methods can be divided into two major categories: a) short range; b) long range. Short range location systems typically operate in buildings, warehouses or campuses and enable using small, low power and low cost locatable transmitters, while long range systems may operate countrywide or even worldwide, yet typically require larger, high power radiating and consuming transmitters to be located. There is no special technological obstacle that disables the location of small and low power transmitters over a wide area, yet this would require deploying a large and dense network of receivers that is not economical and not practical, certainly not at sea.

U.S. Pat. No. 7,155,238 (Katz) discloses a method that enables locating small and low power transmitters over a wide area, without the need to deploy a large and dense network of receivers. The method is based on a two layer network: a) first layer obtains communication devices, possibly mobile, that can be located by a remote control station over a wide area network (WAN); b) second layer obtains short range transmitters that can communicate with said WAN communication devices. Upon establishing a connection between said short range transmitter and said WAN communication device, the remote control station can locate the communication device and consequently the short range transmitter. One embodiment of this invention relates to a fingernail size Bluetooth transmitter that can be located nationwide or worldwide, upon communicating with a Bluetooth enabled cellular device embedded with a GPS receiver. This method can be applied, for example, to a pet locating system: A dog's collar is embedded with a Bluetooth transceiver, obtaining a unique digital ID, and when it passes by a Bluetooth enabled mobile device, a wireless connection is established, the dog's transceiver's ID is reported to the mobile device and retransmitted to a remote control station, over the mobile network, where the mobile device location is determined by current means such as GPS, and accordingly the dog's location is determined. This way the dog is furnished with a small, low transmission power, low consuming power and low cost, yet can be located over a wide area, without deploying any infrastructure further than the cellular network. The shortcoming of this method is the uncertain availability of the process: the dog's location cannot be determined continuously, but only occasionally, as the dog gets close enough to a Bluetooth enabled mobile device. Thus, the availability of the dog's location service cannot be guaranteed beyond statistical expectations. Practically, a dog's location service might be acceptable in terms of "we expect to find your dog within half a day" or so, especially due to the advantages of this method in terms of dog's small and long ending battery life, as well as low cost, yet the uncertain availability of this method probably disqualifies it from been applied to locate people in case of distress.

U.S. Pat. No. 5,650,770 (Schlager et al.) and U.S. Pat. No. 5,963,130 (Schlager et al.) disclose a man-over-board alarm system, comprising a remote unit including a navigational receiver (such as GPS) and a base station, both configured to communicate with each other over a radio link. The base station includes measuring means for determining the distance to the remote unit and when it detects that this distance exceeds a predetermined limit, it causes a man-over-board alarm and displays the location of the remote unit.

This method has two significant limitations: a) it requires a remote unit that includes a navigational receiver (such as GPS); b) the range between the base station, where the alert is detected and the alarm is generated, and the remote unit (man overboard), is limited by the transmission power of the remote unit, which is typically not more than a few hundred meters. The latter definitely does not comply with single handed sailors needs.

U.S. Pat. No. 6,198,390 (Schlager et al.) discloses a man-over-board alarm system, comprising a remote unit including a navigational receiver (such as GPS) and a base station, both configured to communicate with each other over a radio link. The remote unit includes a sensor configured to activate a transmission from the remote unit to the base station upon detecting a hazard, triggering an alarm at the base station.

This method obtains the same limitations as those obtained by U.S. Pat. Nos. 5,650,770 and 5,963,130.

U.S. Pat. No. 7,053,822 (Rickerson, Jr.) discloses a wearable satellite tracker comprising, among other components, a satellite navigation receiver and a two-way satellite transceiver, powered by a portable power source, that can operate as a man-over-board device.

US patent application 20040113836 (Rickerson, Donald JR.) discloses a Wearable Satellite Tracking system comprising: A remote unit embedded in the personal flotation device, commonly called a life vest, with a battery for power, GPS receiver for obtaining accurate position information, alarm sensors that include a panic button to bring the unit to an alarm state, a satellite transceiver for transmitting the location and alarm information to a central tracking monitor, a system status indication that indicates to the wearer of the unit the ability of each of the subsystems to function correctly and optionally a satellite telephone interface to speak and listen to the operator at the Central Tracking Monitor when in an alarm state.

Both U.S. Pat. No. 7,053,822 and US patent application 20040113836, apply a navigational receiver (GPS) in the remote unit, so require a significant size and reduced battery life. Advantageously, U.S. Pat. No. 7,053,822 and US patent application 20040113836 use satellite communications, thus achieves a worldwide range, yet this approach takes its toll. Even Low Earth Orbit (LOE) satellites are typically deployed some hundred miles above the earth surface, hence require the portable unit to transmit at a relatively high power and consume significant battery energy. Consequently, such a portable unit cannot be small enough to be continuously and effortlessly worn by seamen and naval passengers.

US patent application 20020021231 (Schlager, Dan; et al.) discloses a man over board alarm system comprising: a remote unit including a navigational receiver for receiving navigational information defining a location of the remote unit, and a radio transmitter for transmitting the remote unit location; a base station including a radio receiver for receiving the remote unit location; the remote unit and the base station defining a separation distance between the remote unit and the base station; the base station including measuring means for determining whether the separation distance exceeds a predetermined limit, and means responsive to the measuring means for giving an alarm and a display for displaying the remote unit location, whereby, a separation distance exceeding the predetermined limit causes a man-over-board alarm and the base station displays the location of the remote unit.

U.S. Pat. No. 6,439,941 (McClure, et al.) discloses A sea rescue apparatus, comprising: a personal flotation device (PFD); a hydrostatic pressure sensor mounted on said PFD; a global positioning system (GPS) receiver mounted on said PFD; a radio transmitter mounted on said PFD; and a controller connected to said hydrostatic pressure sensor, said GPS receiver, and said radio transmitter; wherein said controller is programmed to transmit location data via said radio transmitter only when said controller detects a hydrostatic pressure signal having at least a selected magnitude for at least a selected duration.

U.S. Pat. No. 6,414,629 (Curcio) discloses a tracking system comprising, in combination: a target unit having a GPS receiver, a signal transmitter to send a signal including a position of the target unit, and a processor to calculate an optimal time interval for transmission of the signal; and a locating unit having a GPS signal receiver, a compass to provide a reference direction of the locating unit, a signal receiver to receive the signal sent by the transmitter of the target unit, a processor to calculate a range and bearing from the locating unit to the target unit, and an indicator to display the range and bearing.

US patent application 20020021231 and both U.S. Pat. Nos. 6,439,941 and 6,414,629 disclose tracking systems based on remote units that include both a navigational receiver such as GPS, and a radio transmitter to contact the base station and report the remote unit status. These two components included in the remote unit suggest, as mentioned before, that the implementation of this unit will probably require a significant volume and power source that will impede the unit from being small and lightweight and easy to be worn. Additionally, the radio connection between the remote unit and base station disclosed in US patent application 20020021231 and both U.S. Pat. Nos. 6,439,941 and 6,414,629 is tricky. If a long range communications is desired, then, as mentioned before, the remote unit will require a significantly large size and limited battery life; on the other hand, if the remote unit should be small and obtain a long battery life, then the communications range will probably be limited and particularly useless for single handed sailors.

All the methods described above have not yet provided satisfactory solutions to the problem of locating a man over board, worldwide, being a passenger or part of a crew or even a single handed sailor, where this man-over-board wears a small and lightweight device such as a wristwatch, comfortable to be continuously worn onboard and operate automatically in a man-over-board situation.

It is an object of the present invention to provide a system and method for the location of a person overboard, worldwide, being a passenger or a crewmember or even a single handed sailor, where this man-over-board wears a small and lightweight device such as a wristwatch, comfortable enough to be continuously worn onboard and operate automatically during a man-over-board situation.

It is another object of the present invention to provide a system and method for determining the location of persons overboard, by leveraging the location capabilities of current and future systems for determining the location of vessels and aircraft in distress, such as COSPAS-SARSAT.

It is also an object of the present invention to provide a system and method for determining the location of persons overboard, by leveraging the location capabilities of current and future radio beacons for determining the location of vessels and aircraft in distress, such as COSPAS-SARSAT EPIRB and ELT and PLB.

It is yet another object of this invention to provide a system and method to locate people in a distress situation, such as suffering a heart attack or being unconscious or intoxicated or severely injured or ill, by a remote station, where this person wears a small and lightweight device such as a wristwatch, that is practically comfortable to be worn and operate automatically upon detecting an alert situation.

It is another object of this invention to provide a system and method to locate objects that fall overboard vessels, such as containers, that while floating at sea present a severe navigational danger, especially to small and non metallic vessels.

It is another object of this invention to provide a system and method to locate objects, such as pets, vehicles, containers, valuables, hazardous materials and so on, by a remote station, where this object is attached with a small and lightweight and low power device.

Other objects and advantages of the invention will become apparent as the description proceeds.

SUMMARY OF INVENTION

As described above, the prior art provides two major approaches for object tracking or tracing (i.e. remote location determination), particularly people. The first approach can be implemented in a local area, such as a building, warehouse or campus, enabling using small, low power and low cost locatable transmitters, while long range systems may operate countrywide or even worldwide, yet typically require larger and high power transmitters to be located, since it is not practical to deploy a dense network of receivers to detect these transmitters in a wide area.

The present invention combines between both tracking approaches mentioned above, and provides both benefits: the traceable object may carry a small and low power device; still this device can be traced over a wide area, even worldwide, without deploying any further infrastructure. Yet, since low power transmitters as this traceable device are limited in range, and a dense network of receivers is wished to be avoided, the present invention uses "intermediate" communication devices that can contact the traceable device from one hand, and on the other hand can communicate with far away antennas, thus virtually enlarge the coverage area on which the traceable device can be detected. Furthermore, if these intermediate communication devices can be traced, by any means such as GPS or Doppler, then the miniature traceable device could also be traced, at least in the resolution of the intermediate device location.

The present invention is directed to a system and method for determining and recording the geographical location of an object attached with a short range wireless device (SRWD), over a wide area, in a vicinity of a radio beacon (RB) in which a unique data is stored, said RB configured to detect said SRWD signals and transmit an alarm message including said unique data, upon identifying a predefined alert status, wherein a remote control station (RCS) is configured to receive said alarm message and locate said RB, and consequently locate said SRWD, and record said SRWD location coordinates and status and said unique data and time of record, comprising:

a) a SRWD attached to each object whose location wished to be recorded, including: a transmitter; and control circuitry to activate the transmitter periodically and/or upon an input;

b) a RB including: a memory for storing the unique data; a transmitter configured to transmit alarm messages; a receiver configured to detect SRWD signals; and a controller configured to control the communications with the RCS and with the SRWD;

c) a RCS including: a receiver or a plurality of receivers configured to receive alarm messages from said RB and determine its geographical location; and means to record and display the RB and SRWD location coordinates, status, said unique data, and time of record.

The SRWD, in one embodiment, is attached to a person or another kind of object and obtains sensors to measure at least one of the following parameters, signaling an alert status if any of these measured parameters reaches a predefined condition or value: a) immersion in water; b) salt water; c) hydrostatic pressure; d) air pressure; e) mechanical shock; f) acceleration; g) inclination; h) heart beat rate; i) blood pressure; j) activation of "panic" (SOS) button; k) temperature; l) concentration of carbon monoxide or other gases; m) blood sugar level; n) electrocardiogram (EKG or ECG) signal.

In another embodiment, the SRWD periodically transmits signals, and when the RB ceases to detect these signals for a predefined period of time, it interprets that as an alert status and transmits an alarm message.

The SRWD can optionally comprise a memory to store a second unique data, and this data can be embedded in the signals transmitted by the SRWD and/or the alarm message transmitted by the RB and received by the RCS. This unique data can be an identification number (administrated by a national or an international organization) or a distress code (such as "man over board", similar to Maritime Emergency Codes such as "Fire/explosion", "Collision", "Sinking" or "Abandon ship").

A LCS (local control station) is connected to the RB, in one embodiment of the present invention, configured to monitor the communications between the RB and the SRWD, and optionally also the communications between the RB and the RCS, said LCS configured to detect an alert status, then output an alarm signal and record the present location and time, comprising: a) a computer including: a CPU, a non volatile memory and a display; b) an output device configured to render audible and/or visual alarm indications; and c) a navigation receiver such as GPS;

The communications among the various devices in the present invention can be further enhanced, according to various embodiments, as suggested following:

a) The communication between the RB and the RCS is either direct or over a network, possibly obtaining access points or gateways or relays, being terrestrial and/or maritime and/or airborne and/or satellite borne. A typical search and rescue system, such as COSPAS-SARSAT, is based on a communication network with satellite and airborne and terrestrial and maritime nodes or stations, through which the information flows.

b) Either the SRWD and/or the RB are possibly configured to relay or retransmit signals that arrive from another SRWD and/or RB in their vicinity. This feature can be useful, for example, in a large system installed in a large ship, comprising several RB units and several SRWD units.

Bidirectional communications between SRWD and RB and/or between RB and RCS can provide further advantages. In this context, the present invention suggests the following:

a) In one embodiment of the invention, the RB further comprises a second receiver and the RCS further comprises a transmitter, said transmitter and receiver configured to communicate with each other, and said RCS configured to acknowledge the RB upon receiving an alarm message, and wherein said RB further obtains an output device, configured to indicate said acknowledgement and/or the RB controller is configured to stop transmitting alarm messages upon been acknowledged by the RCS.

b) In another embodiment, the RB further comprises a second transmitter and the SRWD further comprises a receiver, said transmitter and receiver configured to communicate with each other, said RB configured to acknowledge said SRWD upon transmitting an alarm message, and wherein the SRWD further obtains an output device, configured to indicate said acknowledgement and/or the SRWD control circuitry configured to stop signaling the RB to transmit an alarm message upon been acknowledged by the RB. This feature is particularly useful when one RB serves several SRWD units.

False alarms might happen, and in order to minimize their consequences, the present invention suggests the following methods:

a) In one embodiment, the RB and/or SRWD may further comprise an input device, enabling the operator to cause the RB to transmit a "cancel alarm" message.

b) In another embodiment of the present invention, the RB controller suspends the transmission of an alarm message for a predetermined period of time, and an input device, at the RB and/or at the SRWD, is configured to enable an operator to cancel the current alarm message transmission.

Testing the system is paramount, in order to detect failures in advance. For this purpose, the current invention suggests several methods:

a) An embodiment wherein the SRWD further comprises an input device that upon activation, the SRWD is configured to transmit a "test signal" to the RB, and wherein the RB further comprises an output device, configured to indicate that the "test signal" was received.

b) Another embodiment wherein the RB further comprises an input device enabling at least two choices, and an output device, one of said input choices is assigned as "test", and while set to "test", when the RB ceases to detect the signals of the SRWD for a predefined period of time, said output device is configured to indicate that, wherein said "test" choice is prevented to be set permanently, by mechanical and/or electrical means.

c) Another embodiment, based on the configuration wherein the communications between the RB and RCS is bidirectional and wherein the RCS acknowledges the RB upon receiving an alarm message, then, possibly, the RB and/or SRWD further comprise an input device that upon activation, the RB is configured to transmit a "test alarm" message, and the RCS is configured to acknowledge the "test alarm" message to the RB, and wherein the RB further comprises an output device, configured to indicate that the "test alarm" message was acknowledged by the RCS.

Location determination methods used by the RCS to track the RB may vary, and the present invention is not restricted to any specific method. In this context, the invention suggests the following:

a) The location of the RB is determined either at the RB, by means such as GPS or GLONASS or Galileo, or at the RCS, by means such as Doppler deviation detection, or a combination thereof.

b) Possibly, the location determining of the SRWD is refined by measuring the distance and/or direction between SRWD and RB, at the SRWD or at the RB. It is possible to assess the distance between SRWD and RB by measuring the received signal power level, and using directional antennas at the RB can indicate the direction to the SRWD which is been detected.

COSPAS-SARSAT is a search and rescue system that the present invention is highly correlated with. In this context, the present invention suggests the following:

a) In one embodiment, the RB transmitter is compatible with receivers deployed on satellites, such as SARSAT or COSPAS or COSPAS-SARSAT or ARGOS.

b) In another embodiment, the RB transmitter is a 406 MHz transmitter compatible with the COSPAS-SARSAT system, and the alarm message transmitted by the RB is according to a format used by one of the following beacons:
an Emergency Position Indicating Radio beacon (EPIRB) for maritime use; or
an Emergency Locator Transmitter (ELT) for aviation use; or
a Personal Locator Beacon (PLB) for portable use.

c) In another embodiment of the present invention, the RB transmitter is a 406 MHz transmitter compatible to the COSPAS-SARSAT system, and wherein the RB alarm message includes a "man over board" message encoded in the 406 MHz Beacon Message of an EPIRB or ELT or PLB. Additional distress cases, such as "heart attack" or "carbon monoxide intoxication" or "navigational warning—floating container", may be coded and forwarded as well, preferably if properly regulated and standardized by the relevant organizations.

Homing of the SRWD is a built-in function of the present invention. The SRWD transmitter signal can be detected by a compatible receiver, and traced by prior art methods such as: a) received power level detection; and b) a directional antenna at the receiver. Considering a situation of man-over-board, it is possible that the RB identifies an alert status, transmits an alarm message but the ship sails away from the person over board, in case, for example, of a single handed sailor. Yet, according to the present invention, an alarm message is received at the RCS and the estimated position of the person over board is determined and recorded there. A team that is launched to search and rescue the MOB may use the last recorded position as a coarse estimation, then further try to detect the homing signal of the SRWD transmitter and locate its exact position.

The present invention is not restricted to any specific object to be tracked and in different embodiments of the invention the SRWD may be attached to objects such as persons, animals, pets, vehicles, containers, goods, valuables, mailed/delivered items, weapons, ammunition, hazardous materials, etc.

The invention is further directed to a short range wireless device (SRWD), for determining and recording the geographical location of an object attached with said SRWD, over a wide area, in a vicinity of a radio beacon (RB) in which a unique data is stored, said RB configured to detect said SRWD signals and transmit an alarm message including said unique data, upon identifying a predefined alert status, wherein a remote control station (RCS) is configured to receive said alarm message and locate said RB, and consequently locate said SRWD, and record said SRWD location coordinates and status and said unique data and time of record, comprising:
a) a transmitter;
b) control circuitry to activate the transmitter periodically and/or upon an input.

The invention is also directed to a radio beacon (RB), for determining and recording the geographical location of an object attached with a short range wireless device (SRWD), over a wide area, in a vicinity of said RB in which a unique data is stored, said RB configured to detect said SRWD signals and transmit an alarm message including said unique data, upon identifying a predefined alert status, wherein a remote control station (RCS) is configured to receive said alarm message and locate said RB, and consequently locate said SRWD, and record said SRWD location coordinates and status and said unique data and time of record, comprising:
a) a memory for storing the unique data;
b) a transmitter configured to transmit alarm messages;
c) a receiver configured to detect SRWD signals;
d) a controller to control the communications with the RCS and with the SRWD;

The invention is further directed to a remote control station (RCS), for determining and recording the geographical location of an object attached with a short range wireless device (SRWD), over a wide area, in a vicinity of a radio beacon (RB) in which a unique data is stored, said RB configured to detect said SRWD signals and transmit an alarm message including said unique data, upon identifying a predefined alert status, wherein said RCS is configured to receive said alarm message and locate said RB, and consequently locate said SRWD, and record said SRWD location coordinates and status and said unique data and time of record, comprising:
a) a receiver or a plurality of receivers configured to receive alarm messages from said RB and determine its geographical location;
b) means to record and display the RB and SRWD location coordinates, status, said unique data, and time of record.

BRIEF DESCRIPTION OF DRAWINGS

The above and other characteristics and advantages of the invention will be better understood through the following illustrative and non-limitative detailed description of preferred embodiments thereof, with reference to the appended drawings, wherein.

DETAILED DESCRIPTION

Figure 1:
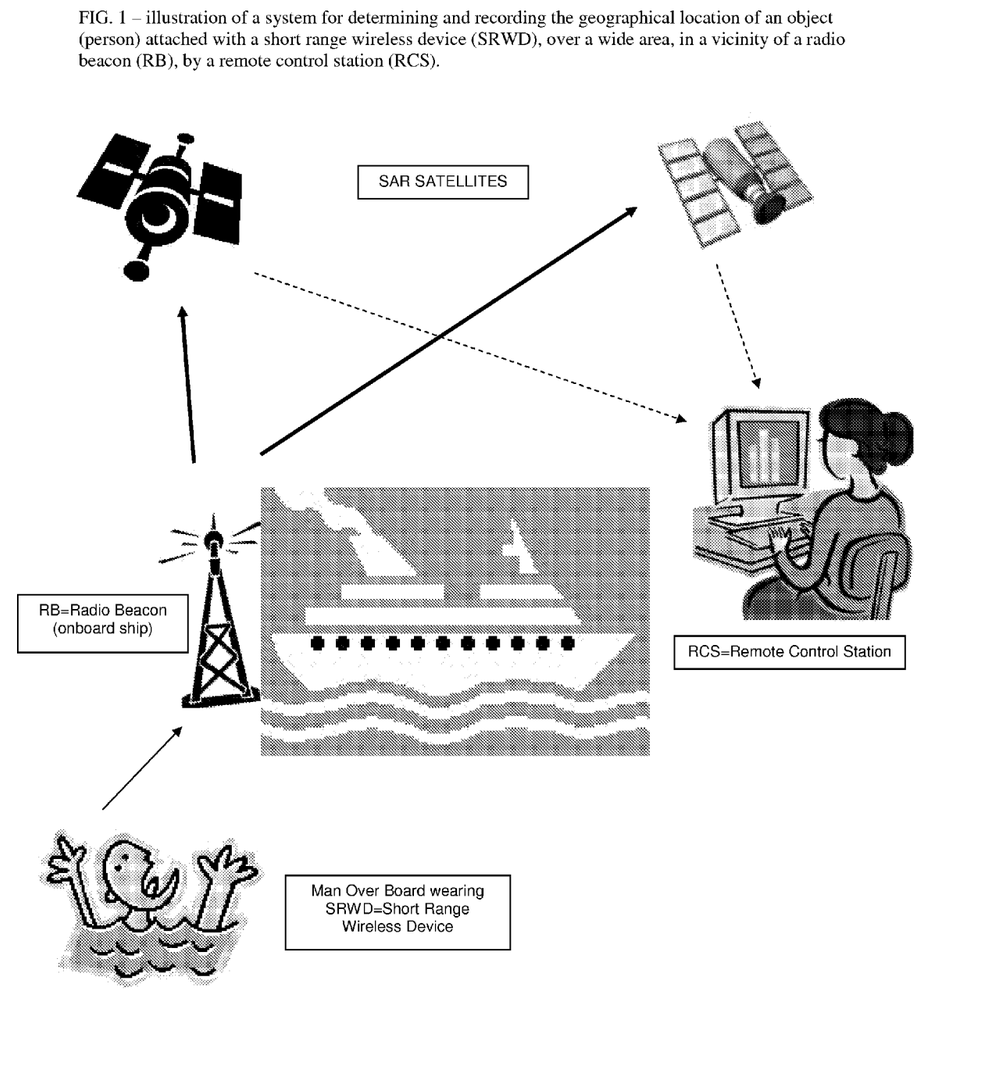
FIG. 1 generally illustrates a system for determining and recording the geographical location of an object attached with a short range wireless device (SRWD), over a wide area, in a vicinity of a radio beacon (RB), by a remote control station (RCS), according to a preferred embodiment of the invention.

FIG. 1 is an illustration of a system for determining and recording the geographical location of an object (person, in a preferred embodiment) attached with a short range wireless device (SRWD), over a wide area (worldwide, in the preferred embodiment), in a vicinity of a radio beacon (RB), by a remote control station (RCS).

In a preferred embodiment, the SRWD is a battery powered device in the size of a wristwatch, worn by a sailor on his/her wrist.

In this embodiment, SAR satellites are COSPAS-SARSAT satellites, and the RB is a COSPAS-SARSAT compatible maritime beacon (406 MHz EPIRB), modified according to the present invention.

The RCS in the preferred embodiment is implemented by a PC laptop connected to a 406 MHz receiver.

Figure 2:
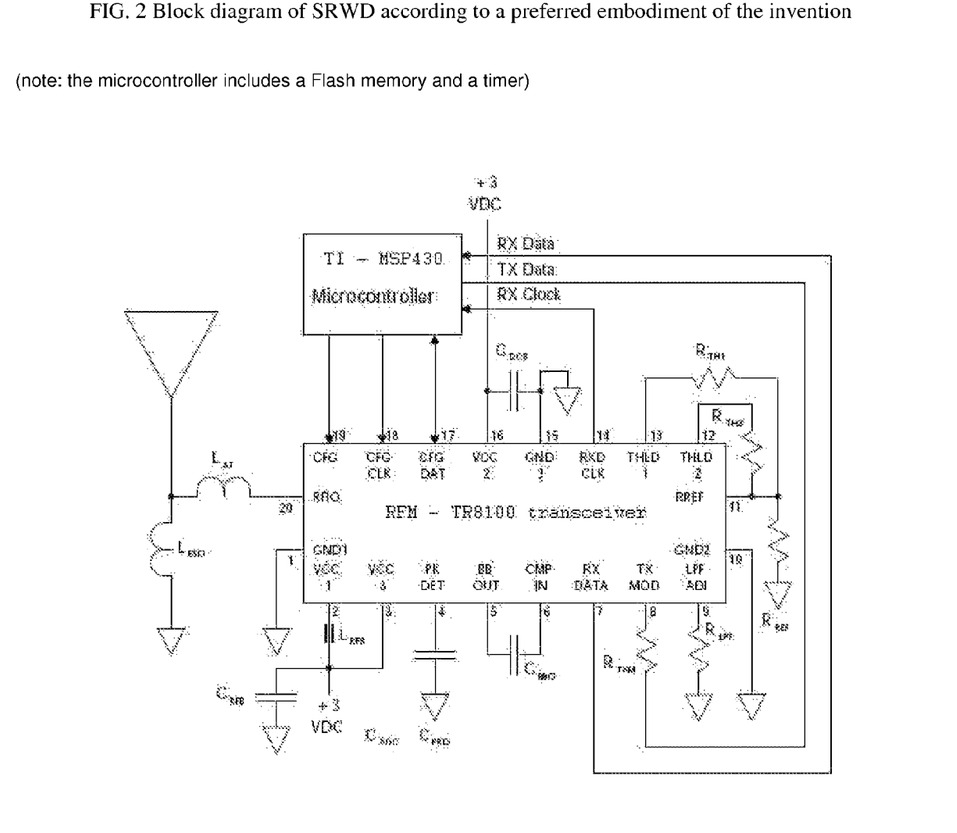
FIG. 2 illustrates the major components of said SRWD according to a preferred embodiment of the invention.

FIG. 2 is a block diagram of the SRWD according to a preferred embodiment of the invention. In this embodiment, the SRWD is based on:
a) a low power single chip transceiver, TR8100, operating on the 915 MHz ISM band, manufactured by RFM (RF Monolithics Inc.), Texas USA; and b) an ultra low power microcontroller, MSP430, manufactured by TI (Texas Instruments) Semiconductors, Texas USA.

Data sheets and other technical information on these components can be further found at:
www.rfm.com
http://www.rfm.com/products/data/tr8100.pdf
and
http://www.ti.com
http://focus.ti.com/docs/prod/folders/print/msp430f2012.html In a preferred embodiment, the SRWD periodically transmits signals, and when the RB ceases to detect these signals for a predefined period of time, it interprets that as an alert status and transmits an alarm message. In this embodiment, the SRWD transmits a short message, for less than 20 ms, every 20 seconds, i.e. less than 1/1000 duty cycle. Upon power up, the SRWD generates a 16 bits pseudo random number (PRN) and uses it as identification number (up to 64 K different IDs) and also as a phase offset factor that determines an initial delay before starting transmission. The phase offset is calculated as PRN×1 ms, enabling about 0-64 seconds of phase offset.

Figure 3:
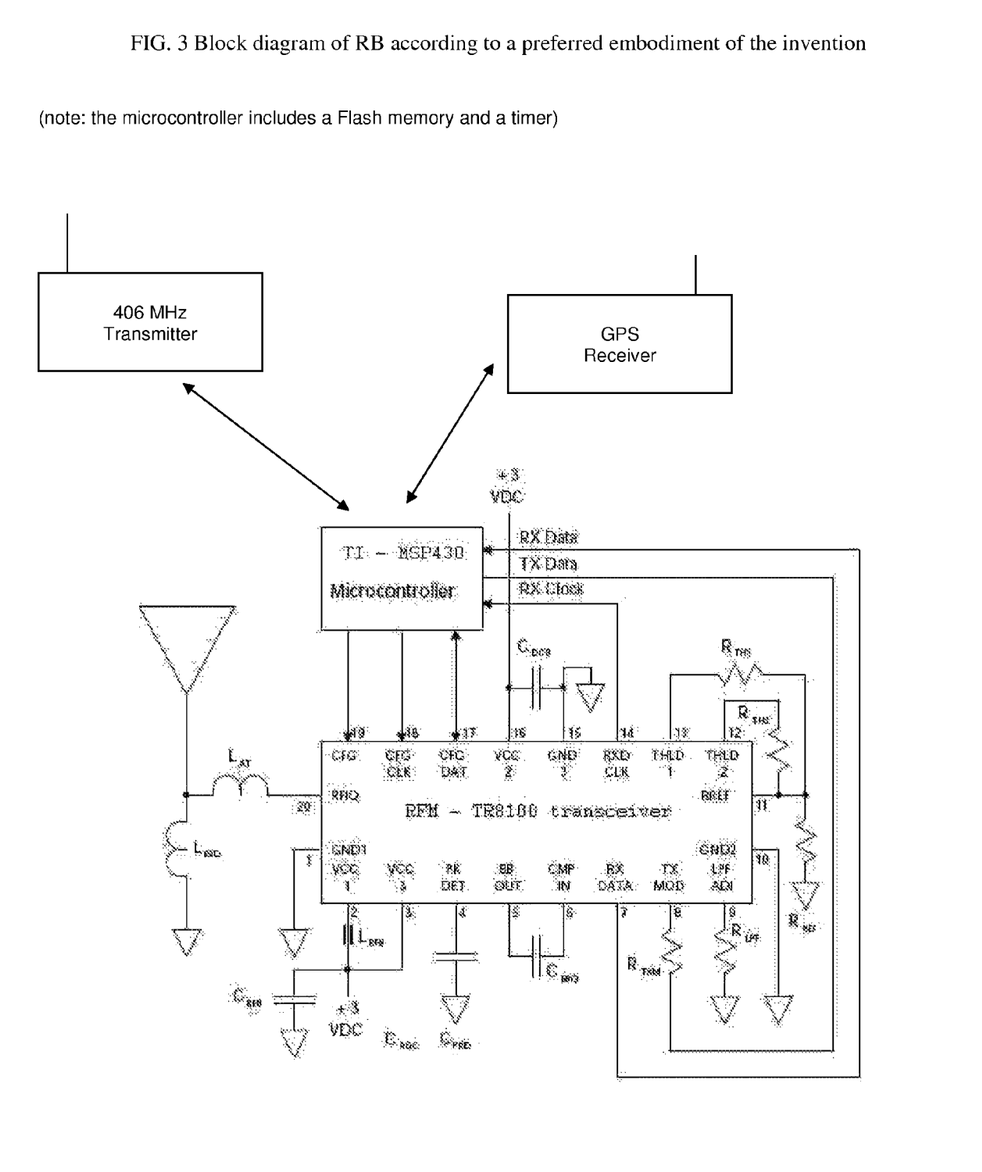
FIG. 3 illustrates the major components of said RB according to a preferred embodiment of the invention.

FIG. 3 is a block diagram of the RB according to a preferred embodiment of the invention. In this embodiment, the RB comprises the same TR8100 transceiver and MSP430 microcontroller as implemented in the SRWD, in addition to a 406 MHz transmitter and a GPS receiver. In this embodiment, the 406 MHz and GPS receiver are part of an EPIRB, GS SMARTFIND PLUS, provided by McMurdo Ltd, Portsmouth, UK.

Data sheets and other technical information on this component can be further found at:
http://www.mcmurdo.co.uk
http://www.mcmurdo.co.uk/products/product.html?product_type=1&product_sector=3&product=3
http://www.mcmurdo.co.uk/doc/8-9.pdf In the preferred embodiment of the RB, an output port bit of the microcontroller is logically connected to the SMARTFIND PLUS switch that manually activates the EPIRB. The SWRD transmits its "keep alive" signal every 20 seconds, and the RB controller is configured to detect these signals through the RB transceiver. Upon detecting the first signal from the SRWD, the controller sets a time slot of 70 seconds, which is been reset every time a new signal is arrived from the same SRWD. If no signal is detected from same SRWD within this time slot, the microcontroller triggers the activation switch of the EPIRB. The SMARTFIND PLUS, been a certified COSPAS-SARSAT EPIRB, transmits, upon activation, an alarm message, according to one of the following COSPAS-SARSAT Message formats: EPIRB National, Standard or User Location Protocol, EIPRB user protocol. A unique data, i.e. the EPIRB identification number, is embedded in the message, either as an MMSI (Maritime Mobile Service Identity) or radio call sign, as configured in advance in the EPIRB. Since the SMARTFIND PLUS includes an integral GPS receiver, the alarm message will include the EPIRB position according to the GPS.

The RCS in the preferred embodiment is implemented by a PC connected to a 406 MHz receiver (phase modulation), via a biphase to NRZ adapter with RS-232 output signal level. The PC runs standard modem software such as Hyper Terminal by Microsoft, in order to decode the incoming messages. The format of the different messages is defined in the following document:
COSPAS-SARSAT
GUIDELINES ON 406 MHz BEACON
CODING, REGISTRATION
AND TYPE APPROVAL
C/S G.005
Issue 2—Revision 2
October 2006

That can be found at—http://www.cospas-sarsat.org/DocumentsGSeries/G5OCT06.pdf

The RF and modulation characteristics of the EPIRB transmitted signals are defined in the following document:
SPECIFICATION FOR
COSPAS-SARSAT
406 MHz DISTRESS BEACONS
C/S T.001
Issue 3—Revision 7
November 2005

That can be found at—http://www.cospas-sarsat.org/DocumentsTSeries/T1Nov05.pdf

According to another embodiment, the RB controller can further manipulate the alarm message transmitted by the EPIRB in order to specifically indicate a "man over board" situation. This may require further regulation and standardization, but then it is possible that the alarm message will bear a "man over board" code, similarly to currently defined Maritime Emergency Codes such as "Fire/explosion", "Collision", "Sinking" or "Abandon ship". In order to implement this aspect of the invention, the RB controller will interface not necessarily the EPIRB activation switch but rather the EPIRB internal logic circuitry.

According to one aspect of the invention, a single handed sailor, wearing a SRWD on his wrist, falls overboard, then as the RB does not detect the SRWD signal for a predetermined period of time, it identifies an alert status and transmits an alarm message. The alarm message is received at the RCS, which also determines and records the RB location and consequently the last known location of the person wearing the SRWD. A helicopter is launched to search and rescue the MOB, according to his last recorded position, then, the SAR team can also use a compatible receiver to detect the SRWD transmitter that may still transmit its periodic signals. In the latter process, the SAR team can further apply received power level detection and a directional antenna at their receiver in order to better trace the SRWD.

According to another aspect of the invention, a container ship makes its way in the ocean, wherein every container is attached with a SRWD, and several RBs are installed onboard (particularly astern) to cover the required communications range with all containers. Preferably, every SRWD further obtains an inclination sensor, configured to trigger the SRWD to signal an alert status to the RB, if the container rolls over board. According to this embodiment, the RB transmits an alarm signal that bears the marine code "Sécurité—navigational warning—floating container". The RCS that receives this message distributes it, along with the last known container position, to all the relevant coast stations, which insert this report in their routine navigational warning broadcast.

According to another aspect of the invention, a passenger ship cruises the Mediterranean with 1000 passengers and crewmembers onboard, all wearing SRWDs configured to signal an alert status upon sensing salt water. Several RBs are installed onboard, particularly astern, featured with high gain directional antennas covering the potential area where a MOB might be. As one of the passengers falls overboard, his SRWD signals the near RB, which suspends transmission of an alarm message for 3 minutes. A LCS installed on the bridge immediately alarms the officer of the deck (OOD), of a MOB situation, indicating his last recorded position. Since the event is under local control, the OOD cancels the transmission of an alarm message to the RCS, and performs everything required in order to search and rescue the MOB by the ship's own resources (stop, turn around, cautiously approach the recorded MOB position, preferably with a smaller boat, etc). If these efforts do not succeed, then the OOD or captain can further transmit a MAYDAY message, indicating a MOB and requiring further assistance for search and rescue.

The present invention is not restricted to any specific object to be tracked and in different embodiments of the invention the SRWD may be attached to objects such as persons, animals, pets, vehicles, containers, goods, valuables, mailed/delivered items, weapons, ammunition, hazardous materials and so on.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A communication system for determining and recording the geographical location of an object falling overboard a moving vessel, comprising:
   a) a short range wireless device (SRWD) attached to said object;
   b) a radio beacon (RB) installed onboard said vessel;
   c) a remote control station (RCS);
      said RB configured to detect non positioning signals emitted by said SRWD while both RB and SRWD are onboard the vessel and upon detecting from said non positioning signals that said SRWD is exceeding a predetermined range away from the RB indicative that said SRWD is no longer onboard, while said onboard RB is on the move, transmit an alarm message comprising unique data identifying said RB and enabling determining the location of said RB; said RCS configured to detect said RB alarm message but not said SRWD signals, and consequently determine the location of said RB, and consequently determine also the location of said SRWD to be the location of the RB at the time of detecting that said SRWD is no longer onboard, and record the SRWD location coordinates and said unique data and time of record;

said SRWD comprising:
 a transmitter configured to emit low power;
 control circuitry to activate the transmitter periodically or upon an input or a combination thereof;

said RB comprising:
 a memory for storing the unique data;
 a transmitter configured to transmit alarm messages;
 a receiver configured to detect SRWD signals;
 a controller configured to control the communications with the RCS and with the SRWD;
 a speed sensor including a GPS receiver;

said RCS comprising:
 a receiver or a plurality of receivers configured to receive alarm messages from said RB;
 means to determine and record and display the RB and SRWD location coordinates.

2. A system according to claim 1, wherein the SRWD further comprises sensors to measure at least one of the following parameters, and means to modulate these measured parameters on said emitted signals: a) immersion in water; b) salt water; c) hydrostatic pressure; d) air pressure; e) mechanical shock; f) acceleration; g) inclination; h) heart beat rate; i) blood pressure; j) activation of "panic" (SOS) button; k) temperature; l) concentration of carbon monoxide or other gases; m) blood sugar level; n) electrocardiogram (EKG or ECG) signal.

3. A system according to claim 1, wherein the SRWD periodically emits signals, and when the RB ceases to detect these signals for a predefined period of time, it transmits an alarm message.

4. A system according to claim 3, wherein the RB further comprises an input device enabling at least two choices, and an output device, one of said input choices is assigned as "test", and while set to "test", when the RB ceases to detect the signals of the SRWD for a predefined period of time, said output device is configured to indicate that, and wherein said "test" choice is configured to prevent been set permanently, by mechanical means.

5. A system according to claim 1, wherein the SRWD further comprises a memory storing unique data identifying said SRWD, and said unique data is embedded in the signals emitted by the SRWD.

6. A system according to claim 1, wherein a local control station (LCS) is connected to the RB, configured to monitor the communications between the RB and the SRWD, and the communications between the RB and the RCS; said LCS configured to detect that the RB transmits an alarm message, then output an alarm signal and record its own present location, as an estimation of the SRWD location, and the current time; the LCS comprising:
 a) a CPU, a non volatile memory and a display;
 b) an output device configured to render at least one of: audible and visual alarm indications;
 c) a Global navigation satellite system receiver (also known as GPS).

7. A system according to claim 1, wherein the communication between the RB and the RCS is either direct or over a network comprising a plurality of communication segments, wherein at least one of these segments being linked to a satellite.

8. A system according to claim 1, wherein said SRWD is configured to relay or retransmit signals that arrive from another SRWD, or said RB is configured to relay or retransmit signals that arrive from another RB, or a combination thereof.

9. A system according to claim 1, wherein the RB further comprises a second receiver and the RCS further comprises a transmitter, said RCS transmitter and RB second receiver configured to communicate with each other, and said RCS configured to acknowledge the RB upon receiving an alarm message.

10. A system according to claim 9, wherein at least one of the RB or SRWD further comprise an input device that upon activation, the RB is configured to transmit a "test alarm" message, and the RCS is configured to acknowledge the "test alarm" message to the RB, and wherein the RB further comprises an output device, configured to indicate that the "test alarm" message was acknowledged by the RCS.

11. A system according to claim 1, wherein the RB further comprises a second transmitter and the SRWD further comprises a receiver, said RB second transmitter and SRWD receiver configured to communicate with each other, and said RB configured to acknowledge said SRWD upon transmitting an alarm message.

12. A system according to claim 1, wherein at least one of the RB and SRWD further comprise an input device, and the RB configured to transmit a "cancel alarm" message upon invoking said input device.

13. A system according to claim 1, wherein the RB controller is configured to suspend the transmission of an alarm message for a predetermined period of time, and an input device, at the RB or at the SRWD or at both, wherein the RB is configured to cancel alarm message transmission upon detecting that said input device was invoked.

14. A system according to claim 1, wherein the SRWD further comprises an input device that upon activation, the SRWD is configured to transmit a "test signal" to the RB, and wherein the RB further comprises an output device, configured to indicate that the "test signal" was received.

15. A system according to claim 1, wherein the location of the RB is determined at the RCS by modulating on the alarm message data arrived from a navigation sensor such as GPS or GLONASS or Galileo integrated or attached to said RB, or by detecting the Doppler deviation of the RB transmission, or a combination thereof.

16. A system according to claim 1, wherein the location determination of the SRWD is refined by measuring at least one of the distance or direction between SRWD and RB, at the SRWD or at the RB.

17. A system according to claim 1, wherein the RB transmitter is configured to be detected by receivers installed onboard satellites, such as but not limited to: SARSAT or COSPAS or COSPAS-SARSAT or ARGOS.

18. A system according to claim 1, wherein the RB transmitter being 406 MHz transmitter for compatibility with the COSPAS-SARSAT search and rescue system, and its alarm message is according to at least one of the following:
 Emergency Position Indicating Radio beacon (EPIRB) for maritime use;
 Emergency Locator Transmitter (ELT) for aviation use;
 Personal Locator Beacon (PLB) for portable use.

19. A system according to claim 18, wherein the RB alarm message includes a "man over board" code.

20. A system according to claim 1, wherein the receiver comprised in said RB further comprising means to measure at least one of: distance or direction to said SRWD.

21. A system according to claim 1, wherein the SRWD is attached to an object from the following group: persons;

animals; pets; vehicles; containers; goods; valuables; mailed/delivered items; weapons; ammunition; hazardous materials.

22. A system according to claim 1, wherein said RB is configured to transmit an alarm message when detecting signals emitted by said SRWD at a lower than a predefined power level, or communicating a predefined code.

23. A system according to claim 1, wherein said SRWD transmitter is configured to comply with unlicensed transmission regulations.

24. A short range wireless device (SRWD), for determining and recording the geographical location of an object attached therewith falling overboard a moving vessel, linked to a radio beacon (RB) installed onboard said vessel, said RB configured to detect non positioning signals emitted by said SRWD while both RB and said SRWD are onboard the vessel and upon detecting from said non positioning signals that said SRWD is exceeding a predetermined range away from the RB indicative that said SRWD is no longer onboard, while said onboard RB is on the move, transmit an alarm message including unique data identifying said RB and enabling determining the location of said RB by a remote control station (RCS), wherein said remote control station (RCS) is configured to detect said RB alarm message but not said SRWD signals, and consequently determine also the location of said SRWD to be the location of the RB at the time of overboard detection, and record the SRWD location coordinates and said uniquely identifying data and time of record;

said SRWD comprising:
 a) a transmitter configured to emit low power;
 b) control circuitry to activate the transmitter periodically or upon an input or a combination thereof.

25. A radio beacon (RB) configured to be installed onboard a vessel, for determining and recording the geographical location of an object attached with a short range wireless device (SRWD) falling overboard said moving vessel, said RB configured to store uniquely identifying data and detect non positioning signals emitted by said SRWD while both RB and SRWD are onboard the vessel and upon detecting from said non positioning signals that said SRWD is exceeding a predetermined range away from the RB indicative that said SRWD is no longer onboard, transmit an alarm message including unique data identifying said RB and enabling determining the location of said RB, wherein a remote control station (RCS) is configured to detect said RB alarm message but not said SRWD signals, and consequently determine the location of said RB, and consequently determine also the location of said SRWD to be the location of the RB at the time of overboard detection, and record the SRWD location coordinates and said uniquely identifying data and time of record;

said RB comprising:
 a) a memory for storing the unique data;
 b) a transmitter configured to transmit alarm messages;
 c) a receiver configured to detect SRWD signals;
 d) means to assess the distance to the SRWD;
 e) a controller configured to control the communications with the RCS and with the SRWD;
 f) a speed sensor including a GPS receiver.

26. A remote control stations (RCS), for determining and recording the geographical location of an object attached with a short range wireless device (SRWD) falling overboard a moving vessel, said SRWD linked to a mobile radio beacon (RB) installed onboard said vessel, in which uniquely identifying data stored, said RB configured to detect non positioning signals emitted by said SRWD while both RB and SRWD are onboard the vessel and upon detecting from said non positioning signals that said SRWD is exceeding a predetermined range away from the RB indicative that said SRWD is no longer onboard, while said onboard RB is on the move transmit an alarm message including said uniquely identifying data and enabling determining the location of said RB, wherein said RCS is configured to detect said RB alarm message but not said SRWD signals, and consequently determine the location of said RB, and consequently determine also the location of said SRWD to be the location of the RB at the time of overboard detection, and record the SRWD location coordinates and said uniquely identifying data and time of record;

said RCS comprising:
 a) a receiver or a plurality of receivers configured to receive alarm messages from said RB;
 b) means to determine and record and display the RB and SRWD location coordinates.

\* \* \* \* \*